United States Patent [19]

Razi et al.

[11] Patent Number: 5,417,904
[45] Date of Patent: May 23, 1995

[54] THERMOPLASTIC POLYMER COMPOSITES AND THEIR MANUFACTURE

[76] Inventors: Parviz S. Razi; Manijeh S. Mobasheri, both of 672 Sherwood Forest Blvd., Baton Rouge, La. 70815

[21] Appl. No.: 56,922

[22] Filed: May 5, 1993

[51] Int. Cl.$^6$ ............................................. B29C 47/02
[52] U.S. Cl. ............................... 264/129; 264/108; 264/119; 264/122; 264/174; 264/211.12; 264/349; 264/DIG. 69; 425/DIG. 46
[58] Field of Search ............... 264/108, 109, 119, 122, 264/211.12, 349, DIG. 69, 129, 174; 425/DIG. 46

[56] References Cited

U.S. PATENT DOCUMENTS

| | | | |
|---|---|---|---|
| 3,578,523 | 5/1971 | Ohse | 264/109 |
| 3,836,412 | 9/1974 | Boustany et al. | 264/108 |
| 3,956,541 | 5/1976 | Pringle | 264/DIG. 69 |
| 4,225,640 | 9/1980 | Erb | 264/DIG. 69 |
| 4,228,116 | 10/1980 | Colombo et al. | 264/122 |
| 4,376,144 | 3/1983 | Gaettler | 264/108 |
| 4,783,493 | 11/1988 | Montegi et al. | 524/13 |
| 4,820,749 | 4/1989 | Beshay | 523/203 |
| 5,055,247 | 10/1991 | Ueda et al. | 264/109 |
| 5,082,605 | 1/1992 | Brooks et al. | 264/108 |
| 5,088,910 | 2/1992 | Goforth et al. | 264/DIG. 69 |

FOREIGN PATENT DOCUMENTS 58101 8/1982 European Pat. Off. ............ 264/349

*Primary Examiner*—Mathieu D. Vargot
*Attorney, Agent, or Firm*—John F. Sieberth

[57] ABSTRACT

Cohesive composite material is formed by forming a mixture of a melt of thermoplastic polymer and wood having a weight average particle size of about 0.1–0.5 inches in the X-axis, about 0.2–0.8 inches in the Y-axis, and about 0.5–1.5 inches in the Z-axis; shaping the resultant wood-filled polymer melt into a compressible shape; compressing this shape to establish additional intimate contact and bonding sites between the polymer melt and the wood disposed therein; and cooling the resultant compressed shape to solidify the polymer. The composites can be readily produced from abundant, low-cost recycled raw materials. Excellent cohesiveness is achieved, preliminary processing of the wood to introduce chemical functional groups therein is not required, and the composites can be readily worked by various techniques such as shaping, planing, sawing, surface grinding or polishing, and nailing, to yield highly decorative end products.

18 Claims, No Drawings

THERMOPLASTIC POLYMER COMPOSITES AND THEIR MANUFACTURE

TECHNICAL FIELD

This invention relates to novel and useful composite materials that can be readily produced from abundant, low-cost raw materials.

BACKGROUND

There have been many attempts to employ recycled plastics in producing final products with sizable market segments, competitive prices, and economical processing techniques. Among other constraints are the restrictions involved in separating different kinds of plastics from their mixture. Attempts to utilize mixtures of plastics having similar physical characteristics have not been particularly successful because in general the resultant products are more expensive than competitive products made from other materials such as virgin plastics, and the properties achieved from products made with mixtures of recycled plastics have not justified their higher purchase prices.

This same trend also exists in the wood industry. By-products from wood processing such as particle boards are used mainly with thermoset polymers, and the usage of such products is hampered because of adverse effects of exposure to water, high humidity, and weathering, and the deficiencies in certain mechanical properties such as fracture toughness and nailing capability.

Approaches used in seeking to improve the cohesiveness of cellulosic materials and polymers such as thermoplastic resins have generally involved chemical treatment of the cellulose to introduce functional groups tending to produce better bonding with the polymer. Such treatments of course add materially to the production cost and consequent selling price.

SUMMARY OF THE INVENTION

A new, useful and cost-effective process for producing composites from wood and thermoplastic polymers is provided by this invention. The process has been found capable of producing composites that exhibit excellent cohesiveness even without subjecting the wood to preliminary processing to introduce chemical functional groups therein. Moreover the composites producible by this invention can be readily worked by various techniques such as shaping, planing, sawing, surface grinding or polishing, etc., to yield highly decorative end products. In addition, this invention makes possible the efficient, cost-effective re-utilization of recycled thermoplastics as well as waste wood or previously-used wood or suitable wood products.

DESCRIPTION OF THE PREFERRED EMBODIMENTS

In one of its embodiments this invention provides a process for producing a cohesive composite material which comprises:
 a) forming a melt of at least one thermoplastic polymer having a melting temperature below about 500° F.;
 b) forming a mixture of particulate wood and said melt while the melt is in molten condition, said particulate wood having a weight average particle size falling in the range of about 0.1 to about 0.5 inches in the X-axis, about 0.2 to about 0.8 inches in the Y-axis, and about 0.5 to about 1.5 inches in the Z-axis to form a particulate wood-filled polymer melt;
 c) shaping said particulate wood-filled polymer melt into a compressible shape;
 d) compressing said compressible shape of particulate wood-filled polymer melt to establish additional intimate contact and bonding sites between the polymer melt and the particulate wood disposed therein; and
 e) cooling the resultant compressed particulate wood-filled melt to solidify the polymer of said wood-filled polymer melt.

A preferred embodiment of this invention is a process for producing a cohesive composite material which comprises:
 a) forming a melt blend of a plurality of different compatible thermoplastic polymers having a melting temperature below about 500° F.;
 b) forming a mixture of particulate wood and said melt blend while the melt is in molten condition, said particulate wood having a weight average particle size falling in the range of about 0.1 to about 0.5 inches in the X-axis, about 0.2 to about 0.8 inches in the Y-axis, and about 0.5 to about 1.5 inches in the Z-axis to form a particulate wood-filled polymer melt blend;
 c) shaping said particulate wood-filled polymer melt blend into a compressible shape while the melt is in molten condition;
 d) compressing said compressible shape of particulate wood-filled polymer melt blend to establish additional intimate contact and bonding sites between the molten polymer melt and the particulate wood disposed therein; and
 e) cooling the resultant compressed particulate wood-filled melt to solidify the polymer of said wood-filled polymer melt.

A feature of this invention is that the weight average particle size of the particulate wood within the solidified wood-filled polymer composites of this invention substantially corresponds to the weight average particle size of the particulate wood introduced into the polymer melt blend. In other words, the products of this invention formed by the above processes have a weight average particle size falling in the range of about 0.1 to about 0.5 inches in the X-axis, about 0.2 to about 0.8 inches in the Y-axis, and about 0.5 to about 1.5 inches in the Z-axis. By "weight average particle size" is meant that of the total weight of wood particles used, at least 50% by weight, preferably at least 65% by weight, and most preferably at least 80% by weight of the wood particles fall within the approximate size ranges herein specified. The point here is that unlike most prior art operations wherein chemically-pretreated wood meal or chemically-pretreated wood flour is used as the filler, this invention uses relatively large-sized wood particles such as wood chips or the like which are not disqualified for use simply because a minor proportion by weight but a major proportion by number of wood particles are smaller in size than herein specified.

The preferred weight average particle size of the wood used pursuant to this invention falls in the range of about 0.3 to about 0.5 inches in the X-axis, about 0.4 to about 0.8 inches in the Y-axis, and about 1.0 to about 1.5 inches in the Z-axis.

Another preferred embodiment is a process for producing a cohesive composite material which comprises:
a) forming a linear melt flow of at least one thermoplastic polymer having a melting temperature below about 500° F.;
b) forming a linear flow of particulate wood, said particulate wood having a weight average particle size falling in the range of about 0.1 to about 0.5 inches in the X-axis, about 0.2 to about 0.8 inches in the Y-axis, and about 0.5 to about 1.5 inches in the Z-axis to form a particulate wood-filled polymer melt;
c) merging said linear flows to form a particulate wood-filled polymer melt;
d) shaping said particulate wood-filled polymer melt into a compressible shape;
e) compressing said compressible shape of particulate wood-filled polymer melt to establish additional intimate contact and bonding sites between the polymer melt and the particulate wood disposed therein; and
f) cooling the resultant compressed particulate wood-filled melt to solidify the polymer of said wood-filled polymer melt.

When merging the foregoing linear flows of this embodiment, it is especially preferred to introduce the linear melt flow of stage a) into the linear wood flow of stage b), and to effect this introduction at an angle of between about 60 and about 120°, more preferably between about 85 and 95°, and most preferably at about 90°.

In yet another preferred embodiment of this invention the process for producing a cohesive composite material comprises:
a) forming a melt blend of a plurality of different compatible thermoplastic polymers having a melting temperature below about 500° F.;
b) introducing said melt blend while the melt is in molten condition into a flow of particulate wood chips to form a wood chip-filled polymer melt blend, said particulate wood chips having a particle size and shape capable of being aligned to pass through a 0.5-inch space;
c) extruding said wood chip-filled polymer melt blend through a die of not less than 0.5-inch orifice size to form a compressible shape while the melt is in molten condition;
d) compressing said compressible shape of wood chip-filled polymer melt blend to establish additional intimate contact and bonding sites between the molten polymer melt blend and the wood chips disposed therein; and
e) cooling the resultant compressed wood chip-filled melt blend to solidify the polymer of said wood-filled polymer melt blend. Preferably, this cooling is effected in a cooling channel through which the compressed wood chip-filled melt blend is passed.

Also provided by this invention is a composite composition which comprises wood chips disposed within a thermoplastic polymer matrix, said composition being further characterized in that said polymer matrix comprises at least one thermoplastic resin and preferably a plurality of compatible thermoplastic resins, in that said wood chips have a weight average particle size falling in the range of about 0.1 to about 0.5 inches in the X-axis, about 0.2 to about 0.8 inches in the Y-axis, and about 0.5 to about 1.5 inches in the Z-axis, and in that said wood chips are derived from weathered wood containing creosote residues. Most preferably these wood chips have a weight average particle size that falls in the range of about 0.3 to about 0.5 inches in the X-axis, about 0.4 to about 0.8 inches in the Y-axis, and about 1.0 to about 1.5 inches in the Z-axis. In either case, the composite is further characterized in that nails can be hammered into the composite without difficulty, and in that the nails remain tightly engaged in the composite. This is vastly different from the nailing characteristics of boards made from thermosetting plastics and small wood particles which often cannot be nailed as the nails do not become tightly engaged in the board. These composites can also be readily worked by various other techniques such as shaping, planing, sawing, and surface grinding or polishing, to yield highly decorative end products.

The above and other embodiments of this invention will be still further apparent from the ensuing description and appended claims.

Any type of particulate softwood or hardwood can be used in the practice of this invention. Thus chipped waste lumber, saw mill waste of suitable size, and the like can be used. Preferably, the wood particles are derived from seasoned or weathered wood because of its lower resin content and better dimensional stability. The term "weathered wood" refers to wood that has been maintained outdoors in a location wherein it has been exposed to the elements—i.e., it has been exposed at least to the atmosphere, rain, sunlight and fluctuations in temperature—for a period of time (usually several years) that is long enough for the wood to have become seasoned. Such weathered wood can be treated wood (e.g., wood treated with copper-containing chemicals, creosote, or other materials designed to increase resistance to weathering or insect attack, or the weathered wood can be untreated wood. A particularly preferred embodiment of this invention utilizes chipped wood formed from reclaimed railroad ties and/or telephone poles. Such weathered wood possesses good dimensional stability and represents an abundant relatively low-cost wood source. Moreover, the reclamation of such wood not only conserves natural resources but provides a highly useful outlet for material which otherwise is often disposed of as landfill or by combustion with consequent environmental impact. Preferably, most of the creosote originally used in treating the railroad ties or telephone poles is removed by any suitable procedure such as extraction methods known in the art. The presence of residual harmless amounts of creosote residues in the chips—e.g., amounts typically less than about 0.01% by weight—is preferred as those amounts pose no known adverse effects, toxicological or otherwise, and may possibly contribute to enhanced bonding between the wood and the thermoplastics used in making the composites of this invention.

As noted above, preferably a plurality of compatible thermoplastic polymers or resins are employed in forming the present composites. Although mixtures of virgin thermoplastics can be used, it is much more preferred to use compatible recycled thermoplastics as this not only provides a novel and highly useful end product, but provides an outlet for low-cost materials that can pose disposal problems because of their abundance and relative non-biodegradability. By "compatible" is meant that the polymer mixture normally appears homogeneous to the eye. Such blends may or may not have enhanced physical properties over the constituent polymers See for example, L. A. Utracki, "Polymer Alloys and Blends, Thermodynamics and Rheology", Hanser Publishers, New York. 1990.

It will be seen therefore that this invention can contribute materially to beneficiation of the environment for the ultimate benefit of all living things, including mankind.

Without desiring to be bound by theoretical considerations it is believed that a tenable explanation for the excellent cohesiveness achievable in the composites of this invention results from the interaction between the molten resin phases in the polymer melt and the pores, irregularities and cavities that exist in the surface areas of the relatively large-sized wood particles used whereby a tight bonding can occur therebetween. In the case of the embodiments wherein a plurality of different compatible thermoplastics are used it is also possible that polymer molecules that have a high affinity for particular types or configurations of wood surfaces of a given wood particle can tightly bond thereto and thereby produce a cohesive finished composite. Whatever the explanation, the products of this invention do possess a remarkable cohesiveness.

Typical thermoplastics which can be used in forming the composites of this invention include, but are not limited to, polyethylene; polypropylene; copolymers of ethylene with one or more monomers such as propylene, 1-butene, 1-pentene, 1-hexene, and 1-octene; copolymers of propylene with one or more monomers such as 1-butene, 1-pentene, 1-hexene, and 1-octene; polybutene; poly(vinyl chloride); ethylene-vinyl acetate copolymer; poly (vinyl acetate); poly(methacrylic acid esters) such as poly(methylmethacrylate); poly(acrylic acid esters); polystyrene; poly-α-methylstyrene; styrene-isobutylene copolymers; styrene-maleic anhydride copolymers; styrene-methylstyrene copolymers; acrylonitrile-styrene copolymers; styrene-vinyltoluene copolymers; α-methylstyrene-vinyltoluene copolymers; ABS; styrene-α-methylstyrene terpolymers with p-tert-butylstyrene, vinyltoluene or limonene; modified polyolefins having carboxylic acid functionality or derivatives thereof (ester, amide, etc.) graft-polymerized thereon; ethylene-vinyl chloride copolymers; propylene-vinyl chloride copolymers; poly(ethylene terephthalate); poly(butylene terephthalate); aromatic polycarbonates; poly(2,6-dimethylphenylene oxide); blends of polystyrene and poly(2,6-dimethylphenylene oxide); poly(phenylene oxide) copolymers; and the like. The polymers can contain small amounts of fillers, antioxidant residues, pigments, and the like, but thermoplastic polymers are preferred that are substantially devoid of reinforcing amounts of reinforcing fillers which might interfere with subsequent processing operations such as shaping, planing, sawing, drilling, polishing, etc. Usually two or more different thermoplastics and preferably at least three different thermoplastic resins (virgin and/or reclaimed) are used in forming the composites of this invention.

Melting or melt blending of the thermoplastics is conducted at any suitable temperature below the sintering or thermal decomposition temperature of the resin(s) in the melt. All that is necessary is to use a temperature high enough to produce a polymer melt that can be caused to flow and to be mechanically worked, and when a melt blend, to produce a relatively uniform mixture of polymer components. Any suitable type of equipment suitable for polymer melt blending can be used for these purposes. Typically, the melting or melt blending can be accomplished in polymer extruders or polymer mixers. Undesirable foreign matter, if any, can be separated from the melt before introduction of the particulate wood.

After forming the polymer melt, it is preferable to introduce the polymer melt or melt blend into a flow of particulate wood preferably under application to the melt of a force in the range of about 10 psi to about 500 psi driving the polymer melt into the flow of particulate wood. This can be accomplished, for example, by extruding the polymer melt at an angle of between about 60° and about 120°, preferably an angle of between about 80° and about 100°, and most preferably at approximately 90°, directly into a screw conveyor, cavity pump or screw pump carrying a continuous linear flow of wood particles such as wood chips. In this operation both the polymer melt and the particulate wood preferably are fed to the equipment substantially continuously, and for best results, the screw conveyor or like mechanism carrying the flow of particulate wood is provided with heating means such as a heating jacket, peripheral heating coils, radiant heaters or the like so that the temperature of the merging and merged flows of wood and polymer is not allowed to fall below the melting temperature of the polymer(s) used. This force-feeding of the polymer melt into the wood flow also ensures that intimate contact is established between the wood particles and the polymer melt, This in turn assists in sealing any moisture content of the wood within the wood particles so that good surface contact and bonding can occur as between the polymers and the wood particles.

The wood-filled polymer melt is then suitably shaped such as by introducing the wood-filled polymer melt into a heated mold of the desired shape and size or, more preferably, by extruding the wood-filled polymer melt through a die of suitable shape and size, such as, for example, a slot die. These operations provide further opportunities for intimate contacting to occur between the wood particles and the polymer melt leading to tight bonding therebetween in the finished composite. Most preferably, the continuous flow of wood-filled polymer melt is passed from the screw conveyor or like mechanism carrying the merged flows of particulate wood and polymer melt directly through a die of suitable shape and size such as a slot die to thereby produce the shaped wood-filled polymer melt.

The shaped wood-filled polymer melt blend is then subjected to compression, preferably at a pressure in the range of about 25 to about 2500 psi and more preferably in the range of about 100 to about 500 psi, in order to still further ensure tight bonding between the wood particles and the polymer blend when subsequently solidified. This compression can be accomplished in various ways such as by use of a roll or flat press, application of pneumatic pressure to the shaped wood-filled polymer melt, or the like. One particularly preferred method of compression is to convey the shaped wood-filled polymer melt through at least one nip of heated rolls of a roll press. Alternatively, compression can be effected by application of mechanical pressure between heated platens of a flat press.

A less preferred way of forming the compressed particulate wood-filled composites of this invention is to shape an unfilled polymer melt blend for example by extrusion through a slot die to form a sheet of the molten polymer mixture, introduce the particulate wood into the molten polymer sheet at suitably spaced intervals, and then subject the resultant wood-filled polymer melt to compression for example by means of a roll press or flat press.

The relative proportions as between the wood particles and the total polymers in the melt blend can be varied depending upon the type of end product desired. Generally speaking, on a weight basis the composite will usually contain from about 10 to about 90, and more preferably from about 20 to about 70, and most preferably from about 40 to about 60 weight percent of wood particles of weight average particle size as described above. However amounts either above or below these ranges can be used whenever deemed necessary or desirable for the purposes at hand in any given situation.

However produced, the wood-filled polymer melt is cooled or allowed to cool in order to solidify the molten polymer of the composite and fix the particulate wood therein. Thereafter the solid composite can be worked such as by sawing, shaping, planing, polishing, or the like.

If desired, any of the operations of the process of this invention—melt blending, introduction of particulate wood to the melt blend, shaping, compression and cooling—can be conducted in stages under different conditions of temperature, pressure and/or time duration. While it is preferred to introduce the polymer melt blend, most preferably as a continuous flow, into a continuous flow of wood particles, it is possible to introduce the wood particles, preferably as a continuous flow, into a continuous flow of polymer melt blend, or to merge flows of both materials, with the proviso that the end product on cooling is a composite having the wood particles suitably dispersed and bonded therein.

Another variant which can be employed is to apply a coating of one or more molten thermoplastics to the wood chips or other suitably-sized wood particles, allow the coating to harden, and then utilize such polymer-coated wood particles as feed for use in the process.

Still another embodiment of this invention is to apply a coating or film of thermoplastic polymer to the composite formed as described hereinabove. This accomplishes the additional advantage of providing a waterproof or at least highly water-resistant exterior surface, thereby ensuring that the encased wood particles cannot readily absorb water from the environment in which the finished composite is used. Thus this invention provides both the method of forming such coated composites and, as articles of manufacture, the novel coated composites themselves.

The following examples are intended to illustrate, but not to constitute limitations on, the practice of this invention.

EXAMPLE 1

A melt was formed from recycled low density polyethylene (LDPE, colored) at about 120°–130° C. Added to the melt was an equal quantity by weight of wood chips formed by chipping weathered telephone poles. These chips had been treated by a proprietary process of Louisiana State University to reduce the creosote level in the chips to an average of less than about 0.01% by weight. The weight average particle size of the chips was within the range of 0.1 to 0.5 inches in the X-axis, 0.2 to 0.8 inches in the Y-axis, and 0.5 to 1.5 inches in the Z-axis. The resultant mixture was well stirred to distribute the wood chips substantially evenly within the melt. The wood-filled melt was then charged into a flat rectangular mold and the shaped charge was then compressed under the platens of a hydraulic press operated at a pressure of 250 psi. The compressed composite was then cooled to room temperature. After mechanically planing the surface of the composite, it was cut into blocks by means of a band saw. The blocks were highly attractive in appearance, and were found to be rigid and cohesive. They possessed good mechanical strength. It was found that a nail could be hammered into the composite without difficulty, and that the nail was tightly engaged in the composite.

EXAMPLE 2

Wood chips such as described in Example 1 are transmitted from a storage silo by a conveyor belt system to the feed hopper of an augur screw extruder. The screw extruder is driven by a 100 hp motor to produce a continuous linear flow of the wood chips in the extruder. Recycled thermoplastic polymer such as described in Example 1 is conveyed by another conveyor belt system to the feed hopper of a second extruder disposed at right angles to the augur screw extruder. The second extruder, driven by a 40 hp motor, is maintained at a temperature about 120°–130° C. to produce a continuous polymer melt flow which is continuously fed into the barrel of the augur screw extruder at a location sufficiently upstream in the barrel to enable thorough intermixing of the plastic melt with the wood chips within the augur screw extruder. The resultant wood chip-plastic composite melt is forced by the augur screw extruder through a die head having an orifice large enough to allow the composite melt to exit the extruder in a selected configuration such as a flat rectangular composite flow. This composite flow is then passed through the nip of hot rolls to compress the composite to a preselected thickness. This compressed composite is then transferred by a cooling channel system to a cutting station wherein the cooled, solidified composite is cut into the desired preselected shapes and sizes.

This invention is susceptible to considerable variation in its practice. Thus this invention is not intended to be limited by the specific exemplifications set forth hereinabove. Rather, the subject matter covered is within the spirit and scope of the appended claims and the permissible equivalents thereof.

What is claimed is:

1. A process for producing a cohesive composite material which comprises:
   a) forming a melt of at least one thermoplastic polymer having a melting temperature below about 500° F.;
   b) forming a flow of particulate wood having a weight average particle size falling in the range of about 0.1 to about 0.5 inches in the X-axis, about 0.2 to about 0.8 inches in the Y-axis, and about 0.5 to about 1.5 inches in the Z-axis;
   c) introducing said melt while the melt is in molten condition, into said flow of particulate wood to form a flow of particulate wood-filled polymer melt;
   d) shaping said particulate wood-filled polymer melt into a compressible shape in which intimate contact is established between particulate wood and polymer melt;
   e) compressing said compressible shape of particulate wood-filled polymer melt to establish additional intimate contact and bonding sites between the polymer melt and the particulate wood disposed therein; and f) cooling the resultant compressed particulate wood-filled melt to solidify the polymer of said wood-filled polymer melt.

2. A process according to claim 1 wherein the polymer melt is a melt blend of a plurality of different compatible thermoplastic polymers having a melting temperature below about 500° F.

3. A process according to claim 1 wherein said particulate wood consists essentially of wood chips.

4. A process according to claim 1 wherein said particulate wood consists essentially of wood chips produced from weathered wood.

5. A process according to claim 4 wherein the weight average particle size of said wood chips falls in the range of about 0.3 to about 0.5 inches in the X-axis, about 0.4 to about 0.8 inches in the Y-axis, and about 1.0 to about 1.5 inches in the Z-axis to form a particulate wood-filled melt blend.

6. A process according to claim 4 wherein said particulate wood chips contain creosote residues in an amount of up to about 0.01 percent by weight.

7. A process according to claim 1 wherein the melt of said at least one thermoplastic polymer is formed in an extruder, wherein said melt is introduced at an angle of between about 60° and about 120° into said flow of particulate wood, and wherein the temperature of the flow of wood-filled polymer melt is maintained above the melting temperature of said polymer melt.

8. A process according to claim 7 wherein said melt of said at least one thermoplastic polymer is extruded directly into said flow of particulate wood at an angle of between about 80° and about 100°, wherein the shaping of said particulate wood-filled polymer melt into a compressible shape is conducted by extruding said flow of wood-filled polymer melt through a slot die, and wherein the compressing of the compressible shape is conducted by compressing the extrudate from the slot die at a pressure in the range of about 25 to about 2500 psi while said melt is in the molten condition.

9. A process according to claim 8 wherein said particulate wood consists essentially of weathered wood chips, wherein the melt of said at least one thermoplastic polymer is extruded at an angle of about 90° directly into said flow of particulate wood at a force in the range of about 10 psi to about 500 psi, and wherein the compressing of said compressible shape is conducted at a pressure in the range of about 100 to about 500 psi.

10. A process according to claim 9 wherein said particulate wood consists essentially of wood chips formed from weathered wood containing creosote, and wherein said at least one thermoplastic polymer comprises low density polyethylene.

11. A process according to claim 1 wherein said particulate wood consists essentially of wood chips produced from weathered railroad ties or weathered telephone poles, wherein the weight average particle size of said wood chips falls in the range of about 0.3 to about 0.5 inches in the X-axis, about 0.4 to about 0.8 inches in the Y-axis, and about 1.0 to about 1.5 inches in the Z-axis, and wherein said particulate wood chips contain creosote residues in an amount of up to about 0.01 percent by weight.

12. A process of producing a cohesive composite material which comprises:

a) forming a linear melt flow of one or more thermoplastic polymers each having a melting temperature below about 500° F.;

b) forming a linear flow of particulate wood, said particulate wood having a weight average particle size falling in the range of about 0.1 to about 0.5 inches in the X-axis, about 0.2 to about 0.8 inches in the Y-axis, and about 0.5 to about 1.5 inches in the Z-axis;

c) merging said linear flows to form a particulate wood-filled polymer melt by extruding the linear melt flow of said one or more thermoplastic polymers into the linear flow of particulate wood at an angle in the range of between about 60° and about 120° and at a pressure in the range of about 10 psi to about 500 psi thereby driving the polymer melt into said flow of particulate wood;

d) shaping said particulate wood-filled polymer melt into a compressible shape and establishing intimate contact between the polymer melt and the particulate wood disposed therein by forcing said particulate wood-filled polymer melt through a slot die;

e) compressing said compressible shape of particulate wood-filled polymer melt to establish additional intimate contact and bonding sites between the polymer melt and the particulate wood disposed therein; and f) cooling the resultant compressed particulate wood-filled melt to solidify the polymer of said wood-filled polymer melt.

13. A process according to claim 12 wherein said angle is between about 80° and about 100°, and wherein the polymer melt and particulate wood are proportioned such that the resultant composite contains from about 20 to about 70 weight percent of wood particles of said weight average particle size.

14. A process according to claim 12 wherein said angle is between about 85° and about 95°, and wherein the polymer melt and particulate wood are proportioned such that the resultant composite contains from about 40 to about 60 weight percent of wood particles of said weight average particle size.

15. A process according to claim 12 wherein said particulate wood consists essentially of wood chips produced from weathered wood which contains creosote residues in an amount of up to about 0.01 percent by weight.

16. A process according to claim 12 wherein said linear melt flow is formed in an extruder, wherein said linear flow of particulate wood is formed in a screw extruder, and wherein said linear flows are merged by introducing said linear melt flow into said linear flow of particulate wood at an angle of about 90° to form a flow of wood-filled polymer melt.

17. A process according to claim 12 further comprising applying a coating of thermoplastic polymer to the composite so produced.

18. A process according to claim 12 wherein said particulate wood consists essentially of wood chips produced from weathered railroad ties or weathered telephone poles, wherein the weight average particle size of said wood chips falls in the range of about 0.3 to about 0.5 inches in the X-axis, about 0.4 to about 0.8 inches in the Y-axis, and about 1.0 to about 1.5 inches in the Z-axis, and wherein said particulate wood chips contain creosote residues in an amount of up to about 0.01 percent by weight.

* * * * *